United States Patent
Parello et al.

(10) Patent No.: US 10,235,516 B2
(45) Date of Patent: Mar. 19, 2019

(54) METHOD FOR AUTHENTICATING A NETWORKED ENDPOINT USING A PHYSICAL (POWER) CHALLENGE

(71) Applicant: Cisco Technology, Inc., San Jose, CA (US)

(72) Inventors: John Parello, Campbell, CA (US); Padmanabhan Ramanujam, Bangalore (IN); Sarat Pollakattu, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 179 days.

(21) Appl. No.: 15/150,851

(22) Filed: May 10, 2016

(65) Prior Publication Data
US 2017/0331803 A1    Nov. 16, 2017

(51) Int. Cl.
| G06F 21/44 | (2013.01) |
| H04L 25/02 | (2006.01) |
| H04L 29/06 | (2006.01) |
| H04L 9/32  | (2006.01) |

(52) U.S. Cl.
CPC .............. *G06F 21/44* (2013.01); *H04L 25/02* (2013.01); *H04L 63/0876* (2013.01); *H04L 9/3221* (2013.01)

(58) Field of Classification Search
CPC ..... H04L 63/08; H04L 9/0891; H04L 9/3221; H04L 63/0876; H04L 25/02; H05B 37/0272; H05B 37/0254; G06F 21/44
See application file for complete search history.

(56) References Cited

U.S. PATENT DOCUMENTS

| 4,785,927 A  | 11/1988 | Dobbins |
| 6,269,343 B1 | 7/2001  | Pallakoff |
| 6,415,270 B1 | 7/2002  | Rackson et al. |
| 6,618,709 B1 | 9/2003  | Sneeringer |
| 6,681,156 B1 | 1/2004  | Weiss |
| 6,686,709 B2 | 2/2004  | Lee et al. |
| 6,721,818 B1 | 4/2004  | Nakamura |

(Continued)

FOREIGN PATENT DOCUMENTS

WO    WO2013/025267    2/2013

OTHER PUBLICATIONS

"Cisco Energywise"; Cisco Systems; Feb. 1, 2009; archived from http://www,archive.org; pp. 1-6.
(Continued)

*Primary Examiner* — Nelson Giddins
(74) *Attorney, Agent, or Firm* — Campbell Stephenson LLP

(57) ABSTRACT

Various systems and methods for using power challenges to authenticate network devices are disclosed herein. For example, one method involves initiating a power challenge to authenticate an endpoint device, which involves, at least in part, requesting the endpoint device to perform a specific power signature; receiving data indicating whether the endpoint device performed the requested power signature within a given time interval, wherein the data can be received from, e.g., a power interface or other device capable of observing the endpoint device; processing the received data to determine if the endpoint device correctly performed the requested power signature; and if the endpoint correctly performed the power signature, authenticating the endpoint.

21 Claims, 8 Drawing Sheets

(56) References Cited

U.S. PATENT DOCUMENTS

| | | |
|---|---|---|
| 6,785,592 B1 | 8/2004 | Smith et al. |
| 6,930,947 B2 | 8/2005 | Chen |
| 6,980,526 B2 | 12/2005 | Jang et al. |
| 7,084,752 B2 | 8/2006 | Parello et al. |
| 7,177,728 B2 | 2/2007 | Gardner |
| 7,188,260 B1 | 3/2007 | Shaffer et al. |
| 7,203,849 B2 | 4/2007 | Dove |
| 7,263,450 B2 | 8/2007 | Hunter |
| 7,324,518 B2 | 1/2008 | Dai et al. |
| 7,337,336 B2 | 2/2008 | Ferentz et al. |
| 7,366,933 B1 | 4/2008 | Aharonian et al. |
| 7,392,407 B2 | 6/2008 | Jonnala et al. |
| 7,698,580 B2 | 4/2010 | Schindler et al. |
| 7,734,572 B2 | 6/2010 | Wiemeyer et al. |
| 7,908,501 B2 | 3/2011 | Kim et al. |
| 7,921,306 B2 | 4/2011 | Dove |
| 7,941,677 B2 | 5/2011 | Penning |
| 7,966,502 B2 | 6/2011 | Diab et al. |
| 7,974,298 B2 | 7/2011 | Baird et al. |
| 8,160,753 B2 | 4/2012 | Ferentz et al. |
| 8,225,124 B2 | 7/2012 | Geiger et al. |
| 8,250,381 B2 | 8/2012 | Hansalia et al. |
| 8,261,104 B2 | 9/2012 | Landry et al. |
| 8,301,918 B2 | 10/2012 | Diab et al. |
| 8,352,754 B2 | 1/2013 | Chin |
| 8,352,769 B1 | 1/2013 | Ghose et al. |
| 8,407,332 B1 | 3/2013 | Kraipak et al. |
| 8,732,501 B1 | 5/2014 | Ghose et al. |
| 8,745,429 B2 | 6/2014 | Ghose et al. |
| 8,849,473 B2 | 9/2014 | Claise et al. |
| 8,996,900 B2 | 3/2015 | Vetteth |
| 9,026,812 B2 | 5/2015 | Ravindranath et al. |
| 9,058,167 B2 | 6/2015 | VerSteeg |
| 9,154,483 B1* | 10/2015 | Haskin .................... H04L 63/08 |
| 9,860,963 B2* | 1/2018 | Lawrenson ........ H05B 37/0254 |
| 9,930,635 B2* | 3/2018 | Skaaksrud ............ H04W 12/06 |
| 2002/0016639 A1 | 2/2002 | Smith et al. |
| 2002/0040475 A1 | 4/2002 | Yap et al. |
| 2002/0157030 A1 | 10/2002 | Barker et al. |
| 2003/0052180 A1 | 3/2003 | Huhn et al. |
| 2003/0120959 A1 | 6/2003 | Bohrer et al. |
| 2004/0073795 A1* | 4/2004 | Jablon .................. H04L 9/0844 713/171 |
| 2004/0148388 A1 | 7/2004 | Chung et al. |
| 2005/0055589 A1 | 3/2005 | Kojo |
| 2005/0123109 A1 | 6/2005 | Yamagishi et al. |
| 2005/0243861 A1 | 11/2005 | Elkayam et al. |
| 2006/0053324 A1 | 3/2006 | Giat et al. |
| 2006/0056397 A1 | 3/2006 | Aizu et al. |
| 2006/0072531 A1 | 4/2006 | Ewing et al. |
| 2006/0184694 A1 | 8/2006 | Monette et al. |
| 2006/0195692 A1* | 8/2006 | Kuhlman .............. H04L 9/3221 713/166 |
| 2007/0014268 A1 | 1/2007 | Kim et al. |
| 2007/0024239 A1 | 2/2007 | Park |
| 2007/0043477 A1 | 2/2007 | Ehlers et al. |
| 2007/0050818 A1 | 3/2007 | Berger et al. |
| 2007/0070998 A1 | 3/2007 | Sethuram et al. |
| 2007/0135086 A1 | 6/2007 | Stanford |
| 2007/0143637 A1 | 6/2007 | Tsai |
| 2007/0189257 A1 | 8/2007 | Suzuki et al. |
| 2007/0214473 A1 | 9/2007 | Barton et al. |
| 2007/0276547 A1 | 11/2007 | Miller |
| 2008/0001584 A1 | 1/2008 | Chen |
| 2008/0037999 A1 | 2/2008 | Masuda et al. |
| 2008/0052546 A1 | 2/2008 | Schindler et al. |
| 2008/0062960 A1 | 3/2008 | Chen et al. |
| 2008/0063381 A1 | 3/2008 | Conroy et al. |
| 2008/0178232 A1 | 7/2008 | Velusamy |
| 2008/0215899 A1 | 9/2008 | Jonnala et al. |
| 2008/0215902 A1 | 9/2008 | Jonnala et al. |
| 2008/0225841 A1 | 9/2008 | Conway et al. |
| 2008/0244282 A1 | 10/2008 | Hansalia et al. |
| 2008/0256371 A1 | 10/2008 | Diab et al. |
| 2008/0272741 A1 | 11/2008 | Kanamori |
| 2008/0301322 A1 | 12/2008 | Horibe |
| 2008/0303486 A1 | 12/2008 | Kao et al. |
| 2009/0049315 A1 | 2/2009 | Diab et al. |
| 2009/0070603 A1 | 3/2009 | Diab et al. |
| 2009/0083167 A1 | 3/2009 | Subbloie |
| 2009/0182834 A1 | 7/2009 | Zettler et al. |
| 2009/0195349 A1 | 8/2009 | Frader-Thompson et al. |
| 2009/0196281 A1 | 8/2009 | Kouchri |
| 2009/0217063 A1 | 8/2009 | Tomita |
| 2009/0217188 A1 | 8/2009 | Alexander et al. |
| 2009/0228723 A1 | 9/2009 | Yoshizaki |
| 2009/0229288 A1 | 9/2009 | Alston et al. |
| 2009/0249091 A1 | 10/2009 | Goodnow et al. |
| 2009/0263127 A1 | 10/2009 | Haran et al. |
| 2009/0282277 A1 | 11/2009 | Sedarat et al. |
| 2009/0310607 A1 | 12/2009 | Evans |
| 2010/0052421 A1 | 3/2010 | Schindler et al. |
| 2010/0070217 A1 | 3/2010 | Shimada et al. |
| 2010/0080111 A1 | 4/2010 | Diab et al. |
| 2010/0111523 A1 | 5/2010 | Hirth et al. |
| 2010/0145542 A1 | 6/2010 | Chapel et al. |
| 2010/0162294 A1 | 6/2010 | Yin et al. |
| 2010/0162305 A1 | 6/2010 | Downey et al. |
| 2010/0172628 A1 | 7/2010 | Berger et al. |
| 2010/0205466 A1 | 8/2010 | Diab et al. |
| 2010/0235868 A1 | 9/2010 | Howarter et al. |
| 2010/0241880 A1 | 9/2010 | Wertheimer et al. |
| 2010/0247068 A1 | 9/2010 | Howarter et al. |
| 2010/0305773 A1 | 12/2010 | Cohen |
| 2010/0309904 A1 | 12/2010 | Couse |
| 2010/0322078 A1 | 12/2010 | Wang et al. |
| 2010/0329108 A1 | 12/2010 | Diab et al. |
| 2011/0022699 A1 | 1/2011 | Powell et al. |
| 2011/0029796 A1 | 2/2011 | Matthews et al. |
| 2011/0067048 A1 | 3/2011 | Barton et al. |
| 2011/0072286 A1 | 3/2011 | Graham |
| 2011/0107092 A1* | 5/2011 | Krig ..................... H04L 9/3271 713/168 |
| 2011/0125337 A1 | 5/2011 | Zavadsky et al. |
| 2011/0131428 A1 | 6/2011 | Diab et al. |
| 2011/0131438 A1 | 6/2011 | Levitan |
| 2011/0157939 A1 | 6/2011 | Wang et al. |
| 2011/0184586 A1* | 7/2011 | Asano ................... G05B 15/02 700/297 |
| 2011/0191608 A1 | 8/2011 | Vetteth |
| 2011/0199046 A1 | 8/2011 | Tsai et al. |
| 2011/0239019 A1 | 9/2011 | Johnston |
| 2011/0246797 A1 | 10/2011 | Diab et al. |
| 2012/0045210 A1 | 2/2012 | Kim et al. |
| 2012/0086345 A1* | 4/2012 | Tran ................... H05B 33/0845 315/158 |
| 2012/0091804 A1 | 4/2012 | Altonen et al. |
| 2012/0095610 A1 | 4/2012 | Chapel et al. |
| 2012/0120958 A1 | 5/2012 | Mahadevan et al. |
| 2012/0131353 A1* | 5/2012 | Nasir ...................... G06F 21/42 713/189 |
| 2012/0131369 A1 | 5/2012 | Paljug |
| 2012/0213085 A1 | 8/2012 | Koren et al. |
| 2012/0226918 A1 | 9/2012 | Rallo |
| 2012/0233478 A1 | 9/2012 | Mucignat et al. |
| 2012/0259474 A1 | 10/2012 | Razu et al. |
| 2012/0284537 A1 | 11/2012 | Kruglick |
| 2013/0132745 A1 | 5/2013 | Schoening et al. |
| 2013/0176104 A1* | 7/2013 | Rich ..................... H04W 12/06 340/5.8 |
| 2013/0219197 A1 | 8/2013 | Lee et al. |
| 2013/0303202 A1 | 11/2013 | Jafarian et al. |
| 2014/0186050 A1* | 7/2014 | Oshima ............. H04B 10/1143 398/118 |
| 2014/0240658 A1* | 8/2014 | Pugh ........................ G02C 7/04 351/159.03 |
| 2014/0337923 A1* | 11/2014 | Anders ............. H04W 52/0229 726/4 |
| 2015/0130587 A1* | 5/2015 | Lydecker ........... H05B 37/0227 340/4.31 |
| 2015/0349917 A1* | 12/2015 | Skaaksrud ......... G06Q 10/0833 370/328 |

(56) References Cited

U.S. PATENT DOCUMENTS

| | | | | |
|---|---|---|---|---|
| 2016/0140370 | A1* | 5/2016 | Pierce | G06K 7/10821 235/462.25 |
| 2016/0270193 | A1* | 9/2016 | Lawrenson | H05B 37/0254 |
| 2016/0370814 | A1* | 12/2016 | Hanley | G05F 1/66 |
| 2016/0377423 | A1* | 12/2016 | Eilers | H04L 9/00 356/601 |
| 2016/0378996 | A1* | 12/2016 | Smith | G06F 21/602 713/190 |
| 2017/0055156 | A1* | 2/2017 | Myers | H04L 63/08 |
| 2017/0103647 | A1* | 4/2017 | Davis | G06F 1/3287 |
| 2017/0105129 | A1* | 4/2017 | Teplin | H04W 24/02 |
| 2017/0112433 | A1* | 4/2017 | Pugh | G02C 7/04 |
| 2017/0244709 | A1* | 8/2017 | Jhingran | H04L 63/10 |
| 2017/0277923 | A1* | 9/2017 | Deal | G06K 7/10821 |
| 2017/0339769 | A1* | 11/2017 | Wennemyr | G01L 11/02 |
| 2018/0082577 | A1* | 3/2018 | Davis | G06F 1/3287 |
| 2018/0096593 | A1* | 4/2018 | Davis | G06F 1/3287 |

OTHER PUBLICATIONS

The Institute of Electrical and Electronics Engineers, Inc.; IEEE Computer Society; Sponsored by the LAN/MAN Standards Committee; "IEEE Standard for Information Technology—Telecommunications and Information Exchange Between Systems—Local and metropolitan area networks—Specific requirements; Part 3: Carrier Sense Multiple Access with Collision Detection (CSMA/CD) Access Method and Physical Layer Specifications; Amendment: Data Terminal Equipment (DTE) Power via Media Dependent Interface (MDI)," ©2003 IEEE; Jun. 18, 2003; 133 ppages. https://ieeexplore.ieee.org/document/1040118/.

Battery University, "How to Prolong Lithium-based Batteries," ©2011 Isidor Bachmann, 15 pages. http://www.batteryuniversity.com/parttwo-34.htm.

Bennett, Mike, "IEEE 802.3az Energy Efficient Ethernet," Task Force Update, Presented to the P802.3ba Task Force, Denver, CO; Jul. 16, 2008; 17 pages. http://www.ieee802.org/3/az/public/jul08/bennett_03_0708.pdf.

Claise, Benoit, et al., "Energy Management (eman): Description of Working Group," retrieved and printed on Aug. 17, 2011, 3 pages. http://datatracker.ietf.org/wg/eman/charter/.

"Data Link Layer," Wikipedia, Jun. 28, 2014, 6 pages. http://en.wikipedia.org/wiki/Data_link_layer.

Haran, Onn, "Applicability of EEE to Fiber PHYs," IEEE 8.02.3 EEE Meeting; Sep. 2007, Seoul, Korea http://www.ieee802.org/3/eee_study/public/sep07/haran_1_0907.pdf; 12 pages.

Jetzt, et al., "LLDP/LLDP-MED Proposal for PoE Plus"; PoE Plus Task Force, Sep. 15, 2006, Knoxville, TN; 15 pages.

Nordman, Bruce, "Energy Efficient Ethernet: Outstanding Questions," Mar. 12, 2007; 3 pages http://grouper.ieee.org/groups.802/3/eee_study/public/mar07/nordman2_01_0307.pdf.

Nordman, Bruce, et al., "Energy Efficiency and Regulation," IEEE 802 Tutorial; Jul. 13, 2009; 58 pages.

SMART Board™, "Interactive Whiteboard," Sep. 2005; 2 pages.

"Wake on Local Area Network (LAN)," EnergyStar Products, Energy Star; [printed on Nov. 16, 2011]; 4 pages; http://www.energystar.gov/index.cfm?c=power_mgt.pr_power_mgt_wol.

Wertheimer, Aviad and Eric Mann, "Active/Idle Toggling with Low-Power Idle," IEEE 802.3az Jan. 2008 Interim Meeting; 15 pages.

Wertheimer, et al., "Capabilities Negotiation Proposal for Energy-Efficient Ethernet," IEEE 802.3az, May 2008, pp. 1-18.

"MAC Address Definition," The Linux Information Project, Sep. 15, 2005; 2 pages http://www.linfo.org.mac_address.html.

"Link Layer Discovery Protocol," Wikipedia, Mar. 28, 2014, 3 pages http://en.wikipedia.org/wiki/Link_Layer_Discovery_Protocol.

"Link Layer Discovery Protocol," Wikipedia, edited Nov. 1, 2017; 4 pages http://en.wikipedia.org/wiki/Link_Layer_Discovery_Protocol.

* cited by examiner

METHOD FOR AUTHENTICATING A NETWORKED ENDPOINT USING A PHYSICAL (POWER) CHALLENGE

FIELD OF THE INVENTION

This disclosure relates to the field of computer networking, and more specifically to using a physical power challenge to authenticate a networked endpoint device.

BACKGROUND OF THE INVENTION

Endpoint devices can be added and removed from a network. Moreover, because endpoint devices are often merely plugged into a network device and/or a power interface, endpoint devices can often be easily and frequently added or removed from a network. The need arises to authenticate an endpoint device in order to determine that the endpoint device connected to a certain network device and/or power interface is, in fact, the endpoint device expected to be connected to that network device and/or power interface.

BRIEF DESCRIPTION OF THE DRAWINGS

Embodiments such as those described herein may be better understood, and its numerous objects, features and advantages made apparent to those skilled in the art by referencing the accompanying drawings.

DETAILED DESCRIPTION

Overview

Disclosed herein are various systems and methods for using a physical power challenge to authenticate an endpoint device. Authenticating an endpoint involves determining whether the endpoint device connected to a certain power interface is, in fact, the endpoint device expected to be connected to that power interface. As one example, authenticating an endpoint involves determining whether a specific lighting device (e.g., Light 17 in Building C) is, in fact, the expected lighting device, and not an imposter device. In one embodiment, this determination is made by requesting the endpoint device (e.g., the lighting device) to perform a specific power signature. In response to issuing the request to perform the power signature, proof of work information is received from one or more devices that are configured to observe the endpoint device, such as a power interface and/or one or more sensor devices. The proof of work information is evaluated to determine whether the endpoint device performed the requested power signature, thereby either confirming that the endpoint device is the expected endpoint device, or optionally triggering an alert if the authentication fails.

Example Environment

Figure 1:
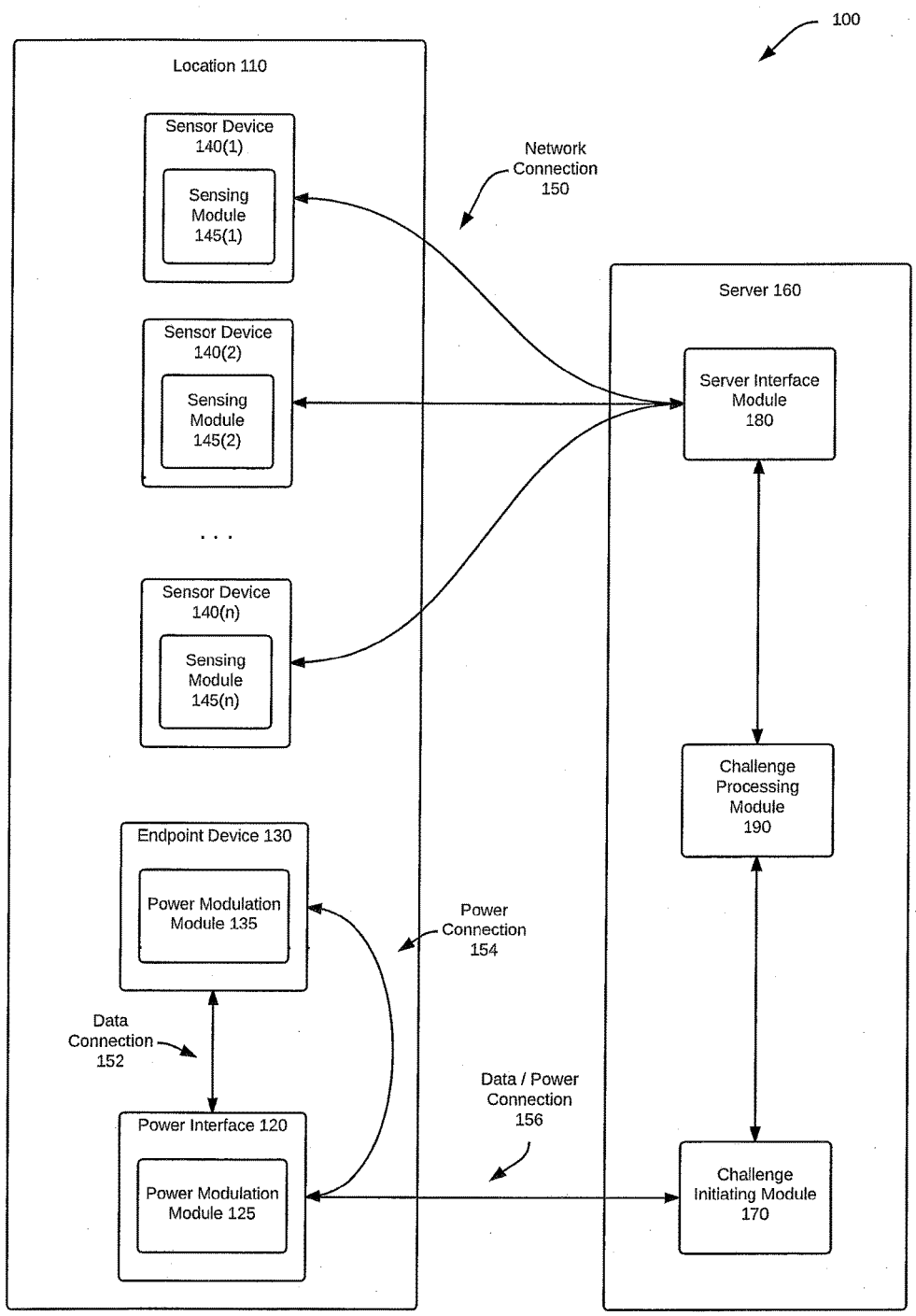
FIG. 1 is a block diagram of an environment, including a location including a power interface, endpoint device, and one or more sensor devices, as well as a server containing various modules and other functionality, according to one embodiment.

FIG. 1 is a block diagram of an exemplary environment 100, according to one embodiment. Environment 100 is configured to authenticate an endpoint device by using systems and methods such as those disclosed herein. More specifically, FIG. 1 depicts a physical location 110 including a power interface 120 having a power modulation module 125, an endpoint device 130 having a power modulation module 135, and sensor devices 140(1)-(n) each having a sensing module 145(1)-(n), each of which are described in more detail below. Power interface 120 is configured to provide power, and at least potentially, data, to a network device. Power interface 120 can itself be a networking device, such as e.g., a switch. Power interface can 120 can also include one or more distinct ports or power receptacles (collectively, "ports"). Although the instant disclosure primarily refers to power interfaces, in practice the specific port to which an endpoint device is connected can also be considered. As shown in FIG. 1, and as the term is generally used herein, power interface 120 is a "smart" power interface that is configured to both receive and transmit data as well as provide power. In other embodiments, however, power interface 120 can be any power interface configured to receive and provide power, in which case endpoint device 130 can receive data via a separate data connection (e.g., wireless network connection, LAN connection, and so forth). Power interface 120 can be any power supply device, such as a power distribution unit (PDU) strip, a three-prong wall power outlet, or any other interface capable of supplying power to the endpoint device. In one embodiment, power interface 120 is also capable of observing the power consumed (e.g., power draw) by a connected device, such as endpoint device 130.

As depicted in FIG. 1, power interface 120 includes power modulation module 125. Power modulation module 125 can be any hardware and/or software module that is configured, or capable of being configured, to perform one or more of the steps in described in this disclosure. Power modulation module 125 can also include any hardware components that are necessary to perform the respective method steps. Power modulation module 125 can be configured to perform one or more of the steps related to power modulation with respect to this disclosure, such as, e.g., providing power to endpoint device 130, and detecting the amount of power consumed by endpoint device 130.

As also shown in FIG. 1, endpoint device 130 includes power modulation module 135. Power modulation module 135 can be any hardware and/or software module that is configured, or capable of being configured, to perform one or more of the steps in described in this disclosure. Power modulation module 135 can also include any hardware components that are necessary to perform the respective method steps. Power modulation module 135 can be configured to perform one or more of the steps related to power modulation with respect to this disclosure, such as, e.g., requesting and receiving power from power interface 120, and modulating the amount of power consumed or otherwise used by endpoint device 130.

Endpoint device 130 is connected to power interface 120 via a data connection 152, which can be any connection capable of transmitting data. Endpoint device 130 is also connected to power interface 120 via a power connection 154, which can be any connection capable of transmitting power. In one embodiment, connections 152 and 154 can be the same connection, such as, e.g., a Power over Ethernet (PoE) connection or a similar connection. Endpoint device is also connected to server 160 via data/power connection 156, and more specifically is connected to challenge initiating module 170 via data/power connection 156. Data/power connection 156 is any connection capable of transmitting power and data, such as a PoE connection or similar connection. In one embodiment, power transmitted to power interface 120, via data/power connection 156, can be supplied by or through server 160, which is discussed in more detail below.

Also shown in FIG. 1 is server 160, which contains various modules, such as challenge initiating module 170, server interface module 180, and challenge processing module 190. Server 160 can be any computer capable of being configured to perform one or more of the steps described in this disclosure, particularly those steps described in conjunction with method 200 and FIG. 2, below. Each of these modules can be any software module that is configured, or capable of being configured, to perform one or more of the steps in described in this disclosure, particularly those steps described in conjunction with method 200 and FIG. 2, below. More specifically, challenge initiating module 170 is configured to perform steps 210, 220, 230, 280, and 285, as described below. Server interface module 180 is configured to perform steps 235 and 290, as described below. Challenge processing module 190 is configured to perform steps 240, 245, 250, 260, 270, and 295, as described below. Each of these modules can also include any hardware components that are necessary to perform the respective method steps.

Server's Role in Power Challenge Authentication

Figure 2:
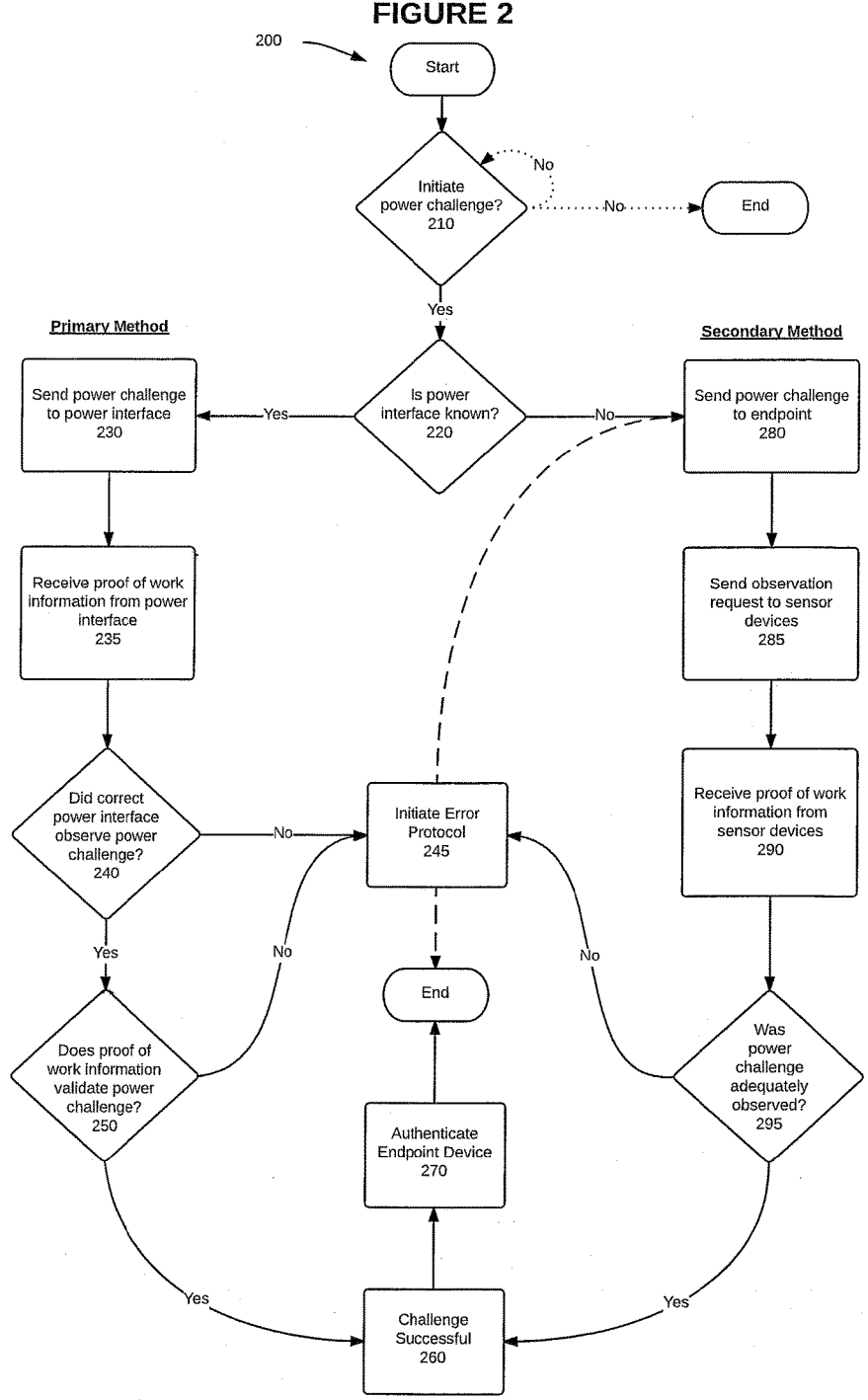
FIG. 2 is a flowchart that illustrates actions that can be performed by a server in conjunction with performing a physical power challenge, according to one embodiment.

FIG. 2 is a flowchart of method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 200, which is described with reference to the example elements shown in FIG. 1, shows a procedure that can be performed by a server (including any modules included therein or otherwise connected thereto) in accordance with this disclosure. More specifically, method 200 depicts a method for performing a physical power challenge in conjunction with embodiments of this disclosure.

Method 200 begins at step 210, where a server, such as server 160, determines whether to initiate a power challenge. In one embodiment, a power challenge is used to authenticate an endpoint device. Authenticating an endpoint involves determining whether the endpoint device connected to a certain power interface (or, to a certain port of a power interface) is, in fact, the endpoint device expected to be connected to that power interface (or port). In one embodiment, the challenged device is an endpoint device, such as endpoint device 130. An endpoint device can be any device capable of performing the device-side functions of a power challenge, including, but not limited to, a lighting device, such as a smart light or another other device capable of emitting light; a laptop computer, desktop computer, or other computer; a telephone (e.g., a Voice Over Internet Protocol (VoIP) handset); an HVAC system or unit (collectively, "HVAC system"); or any other endpoint device that can be configured to operate as needed to operate in accordance with this disclosure. A determination to initiate a power challenge can be made in response to various triggers, e.g., because a new endpoint device was connected, a previously-authenticated device is disconnected from and then reconnected to the network (either because the endpoint device is physically disconnected, or because the network connection temporarily failed, among other potential reasons), detecting that the endpoint device is acting in an erratic or abnormal manner or the occurrence of any other suspicious event, a certain amount of time has elapsed since the endpoint device was last challenged or authenticated, in response to network maintenance, or for many other reasons, including a user-initiated power challenge. As shown in FIG. 2, if server 160 determines not to initiate a power challenge at a given time, step 210 may either loop; pause for a predetermined amount of time and then loop; or end.

When a server makes a determination to initiate a power challenge, method 200 proceeds to step 220. In step 220, the method determines whether the power interface (or port) to which the endpoint is connected is known. That is, method 200 determines whether the server has information identifying the power interface (or port) to which the endpoint device is connected. Although not expressly depicted in FIG. 2, method 200 can also determine at this time whether the identified power interface (or port) is trusted by the server. In certain embodiments, such as the one depicted in FIG. 2, method 200 assumes that the power interface (or port) is trusted by virtue of having certain information about the power interface, such as, e.g., the manufacturer of the power interface. For instance, CISCO trusts power interfaces that were manufactured by CISCO. Other reasons for trusting the power interface are also possible. If a determination is made in step 220 that the power interface (or port) is known (and in certain embodiments, trusted), method 200 then proceeds to step 230. Otherwise, if a determination is made in step 220 that the power interface (or port) is not known (or, if the power interface or port is not either implicitly or explicitly trusted), then method 200 proceeds to step 280, which is discussed in more detail below.

In step 230, the server issues a power challenge to the endpoint device in question. As is discussed in more detail in U.S. patent application Ser. No. 13/492,617, filed on Jun. 8, 2012, by John Parello, Brock Miller, Luis Suau, and Tony Harvey, and commonly assigned to Cisco Technology, Inc. ("the '617 application"), which is incorporated by reference as though set forth in full herein, a power challenge can include a request for the endpoint device to generate (e.g., produce) a specific power signature. A power signature can take the form of a specific activity performed in a specific pattern over a specific time period. Some examples of power signatures include modulating the power consumed by a device in a specific pattern over the course of a given time period, turning a device's fan on and off in a specific pattern over the course of a given time period, blinking or modulating (collectively, "modulating") a light in a specific pattern over the course of a given time period, or changing the ambient temperature or air flow rate (in the case of an HVAC system), among other potential power signatures. These power signatures are only examples, and many other power signatures and requested activities can be used in accordance with this disclosure. In one embodiment, the signature is unique (or at least varied) in each instance. Using multiple signatures adds an additional level of security by preventing a compromised device from repeating a previous signature. In one embodiment, the power challenge may be transmitted to the endpoint (via the power interface in step 230, or directly to the endpoint in step 280, discussed below) in the form of a token. In one embodiment, the power challenge is transmitted over a "Power over Ethernet" (PoE) connection. In other embodiments, the power challenge can be transmitted over a different network connection, such as, e.g., a secure network connection.

As is discussed in more detail elsewhere in this disclosure, the endpoint device will produce (or attempt to produce) the requested power signature upon receiving the power challenge. As discussed elsewhere herein, the power interface observes the endpoint device during the specified time period and gathers information related to such observation. This gathered information is referred to herein as "proof of work" information. The proof of work information can include, e.g., information indicating whether the endpoint device being challenged performed any actions during the specified time period, information indicating any change in the power draw during the specified time period, information such as is described elsewhere herein, and any other relevant information related to the power challenge.

Advantageously, the power interface can gather "proof of work" information either directly or indirectly. That is, the power interface does not have to directly observe performance of the specified activity, but in some embodiments may alternatively (or in combination) observe evidence of performance of the specified activity. For instance, if the power challenge requests the endpoint device to modulate its power in a specific pattern, a power interface may be able to directly observe the modulation of the power draw over the given time period. (As will be appreciated in light of the present disclosure, the power interface can "observe" the amount of power passing through the power interface over any given period.) In this situation, the endpoint device can perform whatever activities are necessary to modulate its power in the pattern requested, with examples of such activities including the endpoint device turning its fan on and off, or brightening and dimming its screen. In a different example, however, the power challenge may request the endpoint device to perform a specific activity, such as blinking or modulating a light in a given pattern. Such an activity may be more easily observed by (other) sensor devices in the room (as discussed below), but a power interface (e.g., a power strip) may not be able to directly observe a light blinking or being modulated (collectively, "being modulated") on the endpoint device. In this situation, the power interface may instead gather evidence of the light blinking or being modulated, such as by observing that the endpoint device's power draw modulated in a manner consistent with blinking or modulating a light. For instance, more power may be needed to turn the light on, and less power may be needed to turn the light off. Thus, even if the power interface cannot directly observe the light blinking or being modulated, the power interface can note the change in the end point device's power consumption over the specified time and include that information in the proof of work information. In any of the above situations, the power interface then transmits the proof of work information to the server, and the proof of work information is received by the server in step 235.

After receiving the proof of work information in step 235, the server determines in step 240 whether the correct power interface (or port) observed the power challenge. As discussed above, prior to sending the power challenge to the power interface, the server determined whether that power interface (or port) was known. More specifically, the server determined whether the server had information indicating the power interface (or port) to which the endpoint device is expected to be attached. In this step 240, the server verifies this initial information by confirming that the power interface (or port) that observed the power challenge is the power interface (or port) to which the endpoint device is expected to be attached. If the correct power interface (or port) observed the power challenge, method 200 then proceeds to step 250, discussed below. If a different power interface (or port) observed the power challenge, then an error has occurred and method 200 will proceed to step 245, where an error protocol is initiated. Similarly, if no power interface (or port) observed the power challenge, then an error has occurred and method 200 will proceed to the error protocol of step 245. In one embodiment, step 240 determines that no power interface (or port) observed the power challenge if a certain amount of time elapses without receiving the proof of work information from the power interface. In one embodiment, this amount of time is an amount of time sufficient to both perform the power challenge and also transmit the necessary messages.

As indicated above, method 200 proceeds to step 245 if the method is unable to determine in step 245 that the correct power interface (or port) observed the power challenge. In one embodiment, the error protocol of step 245 may include performing steps 280 through 295, as described below. In another embodiment, the error protocol of step 245 may include triggering an alert, such as sending an email, text message, or sounding an audible alert. In one embodiment, the error protocol of step 245 may simply end method 200.

As indicated above, method 200 proceeds to step 250 if step 240 determines that the correct power interface (or port) observed the power challenge. In step 250, the server analyzes the proof of work information to determine whether the power challenge was performed as requested. If the power challenge was performed correctly, then the proof of work information will correspond to the parameters of the power signature transmitted in step 230. For instance, if the power signature requested the endpoint device to module its power within a specific range, over a specific time period, then the proof of work information should indicate that the endpoint device did, in fact, modulate its power within that specific range over the specified time period. (Due to innate imprecision in measure voltages and power draws, information evidencing that the endpoint device modulate its power in a pattern that is reasonably close to the specific power range (e.g., within a pre-specified tolerance band) is generally adequate to evidence successful completion of the power challenge.)

If the proof of work information does not adequately evidence that the endpoint device adequately performed the requested power challenge, then method 200 can proceed to step 245, where an error protocol is initiated as described elsewhere herein. If the proof of work information does adequately evidence that the endpoint device adequately performed the requested power challenge, then method 200 proceeds to step 260. In step 260, the endpoint device is authorized because a determination was made in step 250 that the endpoint device successfully performed the power challenge. This authorization may be stored in a data structure that is stored in a non-transient computer-readable storage medium, such as those described elsewhere herein. This authorization may also be stored, recorded, or used in another manner.

Turning back to step 220, if a determination is made in step 220 that the power interface (or port) is not known (or, that the power interface or port is not trusted), method 200 then proceeds to step 280. If the power interface (or port) is either unknown or untrusted, method 200 may invoke other devices to observe the power challenge. In order to invoke other devices (e.g., sensor devices 140(1)-(n)) to observe the power challenge, method 200 sends a power challenge (as described elsewhere herein) to the endpoint device in step 280. In one embodiment, the power challenge may be transmitted in a token (e.g. a control packet). In one embodiment, the power challenge may be transmitted over a PoE or similar connection. In one embodiment, the power challenge may be transmitted over a data connection. In addition to sending the power challenge to the endpoint in step 280, method 200 also sends an observation request to one or more sensor devices step 285. In one embodiment, the sensor devices are located in the same physical location (e.g., the physical same room) as the endpoint. Although all of the steps in method 200 can be performed in different orders than those expressly depicted in FIG. 2, steps 280 and 285 are particularly worth noting as steps that can be performed in either order relative to each other. That is, method 200 can perform step 285 before step 280. Also, in the embodiment described in more detail below, step 285 can be performed without performing step 280 at all.

In one embodiment, the endpoint device being challenged is located in a physical location that contains one or more sensor devices, such as sensor devices 140(1)-(n) (collectively, "sensor devices 140"). As depicted in FIG. 1, each of sensor device 140(1)-(n) includes a respective one of sensing modules 145(1)-(n) (collectively, "sensing modules 145"). Sensing modules 145 can be configured to perform one or more of the steps related to observing power challenges and/or power signatures with respect to this disclosure, such as, e.g., observing endpoint device 130 performing one or more actions such as, e.g., blinking or modulating a light, turning a fan on or off, observing an audible noise, or changing the ambient temperature or air flow rate (such as, e.g., in the case of an HVAC system). As discussed elsewhere herein, each of these sensor devices can each be configured to observe various actions, but each sensor device is not necessarily identical to the other sensor devices in a given room. For instance, one or more sensor devices may be configured to observe a light being modulated (e.g., blinking), whereas other sensor devices in the same physical location may not be capable of observing a light being modulated (e.g., blinking). As another example, one or more sensor devices may be capable of observing an audible noise, whereas other sensor devices in the same physical room may not be configured to observe an audible noise. As another example, one or more sensor devices may be capable of observing a fan being turned on and off, whereas other sensor devices in the same physical location may not be capable of observing such behavior by the endpoint device.

As discussed above with respect to the power interface, the various sensor devices (including any sensing modules contained therein) can gather "proof of work" information either directly or indirectly. That is, a sensor device does not have to directly observe performance of the specified activity, but in some embodiments may alternatively observe evidence of performance of the specified activity. For instance, if the power challenge requests the endpoint device to modulate its power in a specific pattern, a sensor device may not be able to directly observe the power draw for that device if the endpoint device is not directly connected to that sensor device. In this situation, the endpoint device can perform whatever activities are necessary to modulate its power in the pattern requested, with examples of such activities including the endpoint device turning its fan on and off, or brightening and dimming its screen. Although it is not uncommon for such sensor devices to be unable to observe the change in the power draw directly (because, e.g., the endpoint is not physically connected to the sensor device), certain sensor devices can be configured to observe other information that may tend to indicate that the power was modulated, such as the blinking or dimming of a light. In a different example, however, the power challenge may request the endpoint device to perform a specific activity, such as blinking (or otherwise modulating) a light in a given pattern. Such an activity may be more easily observed by the sensor devices in the room, even though a power interface (e.g., a power strip) may not be able to directly observe a light being modulated (e.g., blinking, or being brightened and dimmed) on the endpoint device. In this situation, a sensor devices including the necessary light sensors can directly observe the light being modulated (e.g., blinking, or being brightened and dimmed), and can thus provide direct evidence of the proof of work. In any of the above situations, the power interface then transmits the proof of work information to the server, and the proof of work information is received by the server in step 290. Regardless of the specific configuration of each sensor device, one or more of the sensor devices will gather proof of work information as described elsewhere herein, and transmit that proof of work information to the server (or a similar device), also as described elsewhere herein.

Method 200 receives that proof of work information in step 290. In one embodiment, method 200 will receive proof of work information from each sensor device to which an observation request was sent in step 285. In another embodiment, method 200 will receive proof of work information from each sensor device that received an observation request in step 285 and which is also configured to adequately observe the requested power challenge; thus, for example, if the power challenge involved modulating (e.g. blinking) a light, method 200 may not require a response from a sensor device that is incapable of observing a light being modulated (e.g., blinking). In another embodiment, method 200 will wait a certain amount of time ("expected time") after the observation request is sent in 285, and then proceed with step 290 using only the proof of work information that was actually received by that point in time. This amount of time can be calculated based, at least in part, on the requested duration of the power challenge as well as the expected time to transmit the power challenge (in step 280) and observation request (in step 285) to the intended recipients, and the expected time to receive a response from each of the sensor devices (in step 290).

Method 200 then proceeds to step 295, wherein the proof of work information received in step 290 is evaluated. The criteria used to determine whether the power challenge was adequately observed varies from embodiment to embodiment. This variability can be discussed with respect to at least four broad, logical categories: The ability of sensor devices to observe (or not observe) certain activities (e.g., a blinking light), the failure to receive a response from one or more devices in step 290, the various thresholds that can be used to determine if the power challenge was adequately observed, and the effect of "trusted" and "untrusted" devices on the calculations. Those categories are discussed below.

Turning first to the ability of various sensor devices to observe (or not observe) certain activities, the following example embodiments are provided. In one embodiment, the server (or whatever component is performing method 200) has information indicating the capabilities of each of the sensor devices in the same room as the endpoint device being challenged. If the server has access to such information regarding the capabilities of the sensor devices, that information is considered when determining whether the power challenge was adequately observed in step 295. For instance, assume a power challenge that requires the endpoint device to modulate (e.g., blink, or brighten and dim) a light in a specific pattern over a specific time period. Further assume that there are eleven sensor devices in the same physical room as the endpoint device, but only five of those sensor devices are capable of observing a light being modulated (e.g., blinking). In that situation, method 200 need only consider the proof of work information provided by the five sense devices that are capable of observing the light being modulated. Without having information about the capabilities of the sensor devices, the power challenge might automatically fail because less than half of the sensor devices (at most, five of the eleven sensor devices) are capable of observing the power challenge. When information about the sensor devices' capabilities is considered, however, then method 200 can properly evaluate the proof of work information received in step 290, such as, e.g., in light of one of the threshold values discussed below. By determining that only five devices are even configured to observe a light being modulated, method 200 can (at least potentially) determine that the power challenge was adequately observed if, e.g., even only three sensor devices (i.e., a simple majority of the five devices capable of observing the power challenge) provide proof of work information indicating that the endpoint device successfully performed the power challenge. In other embodiment, other threshold values are possible in addition to a simple majority, with examples of such threshold values being discussed in more detail below. Regardless of the threshold, accurately evaluating the proof of work information (in light of the capabilities of the sensor devices in the room) is important and should be considered when such information can be or has been determined.

Turning next to the failure to receive a response from one or more devices in step 290, various embodiments are possible, some examples of which are as follows. In one embodiment, the failure to receive proof of work information from a given sensor device by the expected time results in an assumption that that sensor device did not adequately observe the power challenge. In another embodiment, the failure to receive proof of work information from a given sensor device by the expected time instead causes method 200 to exclude that sensor device from further calculations. The reason for excluding that sensor device from further calculations can be based on, e.g., the assumption that the observation request and/or proof of work information were not properly transmitted, neither of which provides any meaningful information about whether the endpoint device correctly performed the power challenge. The reason for excluding that sensor device from further calculations can also be based on, e.g., the assumption that the given sensor device did not respond because the given sensor device was incapable of observing the power challenge, either because the sensor device was not sufficiently configured to observe the power challenge (e.g., the blinking light example), the sensor device was sufficiently configured but not sufficiently positioned to observe the power challenge (e.g., located behind an endpoint device that is blinking (or otherwise modulating) a light on the front of the endpoint device), the sensor device experienced a technical failure (e.g., powering off) during the period of the power challenge, or other potential reasons. In any of these embodiments, the specific manner in which a failure to receive proof of work information is handled can be determined by an administrator or other person, and/or can be determined as part of an algorithm or other software component.

Regarding the necessary threshold values, in one embodiment, a unanimous consensus of the sensor devices is needed. In another embodiment, a majority of the sensor devices must adequately observe the power challenge. In another embodiment, a certain percentage (which can be set by an administrator or other person, or which can be calculated as part of an algorithm or other software component) of the sensor devices must adequately observe the power challenge for step 295 to determine that the power challenge was successfully observed. In still another embodiment, the proof of work information can be weighted based on characteristics of the observing sensor device, and a weighted average can then be calculated and compared to a predetermined threshold value (which can be determined manners similar to the aforementioned "certain percentage"). Further information regarding such "weighted average" embodiments is provided below.

Regarding trusted and untrusted devices, in one embodiment of method 200, certain sensor devices may be designated as "trusted devices" (e.g., a known switch) whereas other sensor devices may be designated as "untrusted devices" (e.g., another endpoint device). A device may be trusted because that device is manufactured by a trusted manufacturer, for instance, the same manufacturer that is requesting the power challenge. That is, CISCO may designated other devices made by CISCO as "trusted devices," whereas CISCO may not automatically designate other endpoint devices as "trusted devices." Similarly, a device may be trusted because the device is relatively hard to move or "swap out," whereas a device that is easier for someone to unplug and replace may not be trusted. Again, a switch may be viewed as a trusted device, since switches are not easy to replace, whereas another endpoint device may be untrusted because such endpoint devices can be easily replaced (e.g., such as with a similar-but-compromised endpoint device).

In the situation where the trustworthiness of the sensor devices is considered by method 200, step 295 may weigh proof of work information received from trusted sensor devices more heavily than proof of work information received from untrusted sensor devices. In a different embodiment involving trusted and untrusted sensor devices, step 295 may only consider proof of work information received from trusted sensor devices, and may evaluate the proof of work information received from the trusted sensor devices in any of the manners described herein (e.g., unanimous consensus, majority, certain percentage of such devices, and so forth). In a different embodiment involving trusted and untrusted sensor devices, step 290 may only consider proof of work information received from the untrusted sensor devices if the trusted devices fail to adequately evidence a successful completion of the power challenge by the endpoint device. The trusted devices may fail to adequately evidence successful completion of the power challenge if no trusted devices are available, if no trusted devices respond prior to expected time in step 290, or if the proof of work information provided by the trusted devices fails to meet the selected criteria (e.g., unanimous consensus, majority, certain percentage of such devices, and so forth). If step 290 considers the proof of work information received from the untrusted devices due to the inadequacy of any proof of work information received trusted devices, the proof of work information received from the untrusted devices may be evaluated with respect to any of the thresholds or methods described herein (e.g., unanimous consensus, majority, certain percentage of such devices, weighted average, and so forth). In another embodiment, the proof of work information received from the trusted and untrusted devices may be weighted and combined, and then compared to a minimum weighted average, minimum threshold value, or other designated value.

Regardless of the specific parameters used, if the proof of work information adequately evidences that the endpoint device adequately performed the requested power challenge, then method 200 proceeds to step 260. In step 260, the endpoint device is authorized because a determination was made in step 295 that the endpoint device successfully performed the power challenge. This authorization may be stored in a data structure that is stored in a non-transient computer-readable storage medium, such as those described elsewhere herein. This authorization may also be stored, recorded, or used in another manner. If the power challenge was not adequately observed, then an error has occurred and method 200 will proceed to step 245, where an error protocol is initiated. Because (at least some of) steps 280 through 295 have already been performed in this scenario, method 200 generally would not repeat those steps. Rather, the error protocol of step 245 can either trigger an alert, such as sending an email, text message, or sounding an audible alert; or simply end method 200.

As is the case with any of the methods discussed herein, the steps of method 200 can be performed in a different order than the order which is depicted in FIG. 2, and certain steps may be added or omitted as appropriate. With specific respect to FIG. 2, however, at least one alternate embodiment bears specific mention. As shown in FIG. 2, steps 230, 235, 240, and 250 constitute the "primary method" for performing this method; and steps 280 to 295 constitute the "secondary method" for performing this method; with steps 245, 260, and 270 being common to both methods. In one of the embodiments discussed above, the primary method is performed first, and the secondary method is then performed if the primary method is unsuccessful. The discussion above also allows for only the secondary method to be performed, if the determination of step 220 is "no." However, other alternatives are also possible, although not expressly depicted in FIG. 2, as follows:

For example, in order to prevent the endpoint device from potentially being required to perform the power challenge twice (within a single iteration of method 200), certain steps in the primary method may be performed at substantially the same time as related steps in the secondary method. Thus, for instance, the server may send the power challenge to the power interface (step 230) and the server may also send the observation request to the sensor devices (step 285) at substantially the same time. (Because the server maintains information regarding the power interface and/or port to which the endpoint device is connected, the server does not have to send a separate power challenge request directly to the endpoint device, thereby allowing step 280 to be skipped in this embodiment.) The timing of these steps need not be precise, as long as steps 230 and 285 are both performed by the server prior to the endpoint device beginning the power challenge. By performing the steps in this sequence, the server may then receive proof of work information from both the power interface (in step 235) and from the sensor devices (in step 290) based on the same power challenge, thereby minimizing both the time and the work that has to be performed by the endpoint device. In this embodiment, the server would still analyze the proof of work information received from the power interface (step 250) first. If that proof of work information adequately evidences the successful completion of the power challenge, then the method can simply discard the proof of work information received from the sensor devices, and instead proceed to step 260. However, if a determination is made in step 250 that the proof of work information received from the power interface does not adequately evidence the successful completion of the power challenge, method 200 can then proceed to step 295 (perhaps by way of step 245, in one embodiment) without requiring the endpoint device to re-perform the power challenge. Thus, this embodiment reduces the time taken and the work performed by the endpoint device in the situation where the primary method fails and the secondary method is needed.

In another embodiment, the proof of work information received from the power interface may provide some evidence that the endpoint device performed the power challenge, without necessarily providing sufficient evidence (either in quality and/or in quantity) to determine that the endpoint device successfully performed the power challenge. For instance, the power interface may only observe a part of the power signature, or may only observe the power signature during part of the specified time period. As another example, the power interface may observe power modulation that is close to a specified power band and modulation pattern, but not exactly with the required parameters (e.g., a pre-specified tolerance band). As one example, if the power signature requires the endpoint device's power consumption to be modulated over a certain range, the pre-specified tolerance band may include ±10% of that range. If the endpoint device observes the endpoint device's power being modulated outside of the proscribed range of the power signature, but still within the tolerance range, such proof of work information may tend to indicate that the endpoint device completed the power challenge but without that proof of work necessarily being adequate in and of itself. In another example, any values within a first tolerance range (e.g., ±10%) may be considered adequate, while values outside of that first tolerance range but still within a second tolerance range (e.g., ±25%) may be informative while not necessarily adequate alone. In situations such as these, the proof of work information provided by the power interface may not be adequate to evidence the successful completion of the power challenge, but that proof of work information may nevertheless be considered in combination with the proof of work information provided by the sensor device(s) to determine whether the endpoint device adequately completed the power challenge. For instance, the proof of work information provided by the power interface can be given a "confidence score," combined the proof of work information from the sensor device(s), and the combined score can then be evaluated against a minimum threshold score to determine if the combined proof of work information adequately evidences the successful completion of the power challenge by the challenged endpoint device.

Power Interface's Role in Power Challenge Authentication

Figure 3:
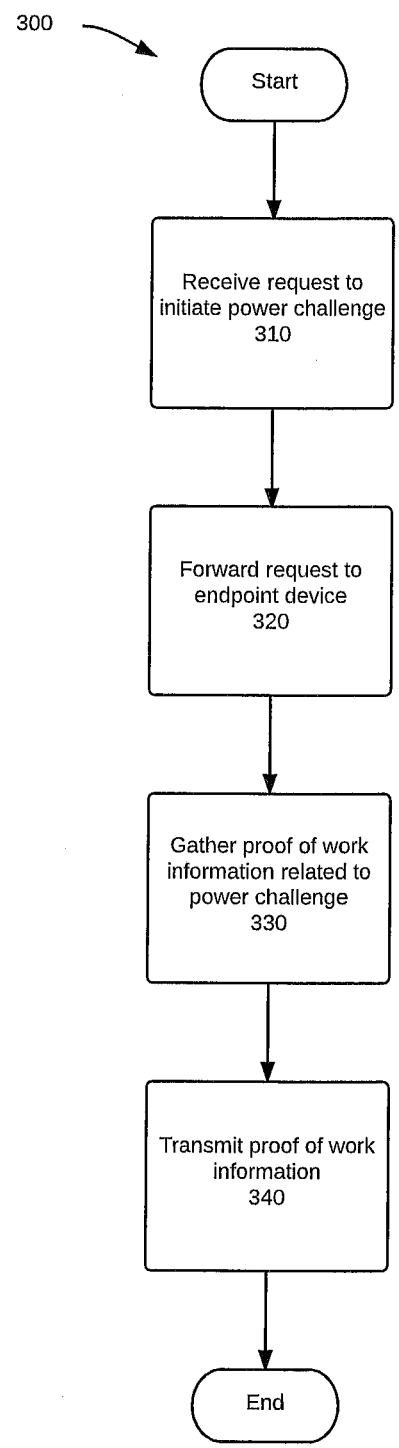
FIG. 3 is a flowchart that illustrates actions that can be performed by a power interface in conjunction with performing a physical power challenge, according to one embodiment.

FIG. 3 is a flowchart of method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 300, which is described with reference to the example elements shown in FIG. 1, shows a procedure that can be performed by a power interface (including any power modulation module included therein or otherwise connected thereto) in accordance with this disclosure. More specifically, method 300 depicts a method for observing a physical power challenge in conjunction with embodiments of this disclosure. In one embodiment, method 300 depicts steps that can be performed in conjunction with steps 210 through 235 of FIG. 2.

Method 300 begins at step 310, where a power interface, such as power interface 120, receives a request to initiate a power challenge. In one embodiment, this request includes the parameters of the power signature that is requested, including at least, e.g., the specific action(s) to be performed and the specific time intervals during which those action(s) should be performed. In such an embodiment, power interface 120 is a power interface, such as the power interface discussed herein in conjunction with method 200. For example, the request to initiate a power challenge may be received in the form of a token, or other data format, such as, e.g., a data packet. Such a request to initiate a power challenge may be received via a PoE connection, for example, although embodiments can use other connections, such as, e.g., a secured network connection or a data connection. Upon receiving the request to initiate a power challenge, the receiving power interface forwards that request to the connected endpoint device, in step 320.

After forwarding the request to the connected endpoint device, the power interface then performs step 330. In step 330, the power interface observes the endpoint device during the specific time interval and gathers appropriate proof of work information. Further details regarding the types of information that may be gathered, and the manner in which that information may be gathered, is provided above with respect to method 200, and specifically with respect to (but not limited to) the discussion of steps 235 and 240.

For instance, and as discussed above, the power interface gathers proof of work information about the endpoint device during the time period designated by the power challenge. In one embodiment, the gathered proof of work information relates to the specified power signature included with the power challenge. For instance, if the power signature requested the endpoint device to module its power within a specific power range, the power interface may gather information related to such power modulation during the specified time period. If the power signature requested the endpoint device to turn cycle the fan, the power interface may gather information related to the fan during the specified time period. As another example, if the power signature requested the endpoint device to blink or otherwise modulate a light in a specific pattern, the power interface may gather information related to the emittance of light by the endpoint device. In other embodiments, other information gathered be gathered as appropriate for a given power signature and power challenge.

As discussed above, the power interface can gather this proof of work information either directly or indirectly. That is, the power interface does not have to directly observe performance of the specified activity, but in some embodiments may alternatively observe evidence of performance of the specified activity. For instance, if the power challenge requests the endpoint device to modulate its power in a specific pattern, a power interface (or port) may be able to directly observe the modulation of the power draw over the given time period. (To state the obvious, the power interface can "observe" the amount of power passing through the power interface (or a port thereof) over any given period.) In this situation, the endpoint device can perform whatever activities are necessary to modulate its power in the pattern requested, with examples of such activities including the endpoint device turning its fan on and off, or brightening and dimming its screen. In a different example, however, the power challenge may request the endpoint device to perform a specific activity, such as blinking (or otherwise modulating) a light in a given pattern. Such an activity may be more easily observed by other sensor devices in the room (as discussed below), but a power interface (e.g., a power strip) may not be able to directly observe a light being modulated (e.g., blinking) on the endpoint device. In this situation, the power interface may instead gather evidence of the light being modulated (e.g., blinking), such as by observing that the endpoint device's power draw modulated in a manner consistent with a light being modulated (e.g., blinking, or being brightened and dimmed). For instance, more power may be needed to turn the light on, and less power may be needed to turn the light off. Thus, even if the power interface cannot directly observe the light being modulated (e.g., blinking), the power interface can note the change in the end point device's power draw over the specified time and include that information in the proof of work information.

After gathering the relevant proof of work information, the power interface transmits the proof of work information in step 340. In one embodiment, the proof of work information is transmitted to the server that issued the request that was received in step 310. In one embodiment, this proof of work information is transmitted via the PoE connection over which the request was received in step 310, but in other embodiments, the proof of work information can be transmitted over other connections, such as, e.g., a secured network connection. In one embodiment, the proof of work information is transmitted via a data packet, although the proof of work information may be transmitted in other formats as well.

Endpoint Device's Role in Power Challenge Authentication

Figure 4:
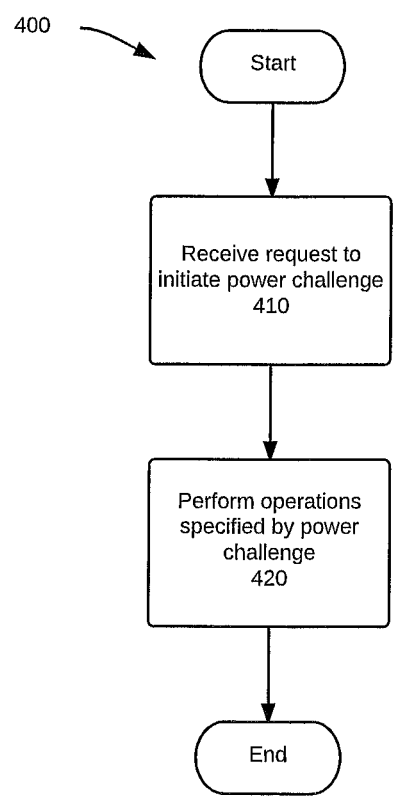
FIG. 4 is a flowchart that illustrates actions that can be performed by an endpoint device in conjunction with performing a physical power challenge, according to one embodiment.

FIG. 4 is a flowchart of method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 400, which is described with reference to the example elements shown in FIG. 1, shows a procedure that can be performed by an endpoint device (including any power modulation module included therein or otherwise connected thereto) in accordance with this disclosure. More specifically, method 400 depicts a method for performing a physical power challenge in conjunction with embodiments of this disclosure.

Method 400 begins at step 410, where an endpoint device, such as endpoint device 130, receives a request to initiate a power challenge. In one embodiment, this request includes the parameters of the power signature that is requested, including at least, e.g., the specific action(s) to be performed, the specific pattern in which those actions are to be performed, and the specific time intervals during which those action(s) should be performed. In one embodiment, this request is received from a power interface, such as power interface 120. In another embodiment, this request is received from a server, such as server 160, via a network or other connection, such as PoE connection 152, although embodiments can use other connections, such as, e.g., a secured network connection. In one embodiment, the request to initiate a power challenge may be received in the form of a token, or other data format, such as, e.g., a data packet.

In step 420, the endpoint device attempts to perform the power challenge. Further details about power challenges can be found in the '617 application, which is incorporated by reference as though set forth in full herein. As discussed in additional detail above, the endpoint device is responsible for performing whatever actions are necessary to execute the power challenge. For instance, if the power signature requires the endpoint device, such as a laptop or a phone, to modulate its power consumption within a certain range, the endpoint device may so modulate its power by, e.g., turning its fan on and off (in the case of a laptop or similar endpoint device), by brightening and dimming the display screen (of a laptop, phone, or other endpoint device with a screen that can be brightened and dimmed), and so forth. The specific manner in which the endpoint device modulates its power consumption is not important, as long as the endpoint device modulates its power consumption within the correct range, in the specified pattern, and/or over the specified time period. As another non-limiting example, if the power signature requires an endpoint device (such as a light, for example) to modulate its power consumption within a certain range, the light may so modulate its power by, e.g., blinking, by brightening and dimming its luminescence output, and so forth. The specific manner in which the light modulates its power consumption is not important, as long as the light modulates its power consumption within the correct range, in the specified pattern, and/or over the specified time period. Similarly, but distinctly, if the power signature requires the light to blink (as one example) in a specified pattern (as opposed to modulating its power consumption within a given range), then the light must cause itself to blink in that specific pattern, regardless of how much power is consumed. The specific manner by which the light (or other endpoint device) accomplishes that blinking (or other such detectable operation), however, is left to the endpoint device to effect in a manner appropriate to its implementation. The important point is that the endpoint device performs the requested power challenge, but again, the specific manner in which the endpoint device satisfies the parameters of the power challenge is determined by the endpoint device.

Sensor Devices' Role(s) in Power Challenge Authentication

Figure 5:
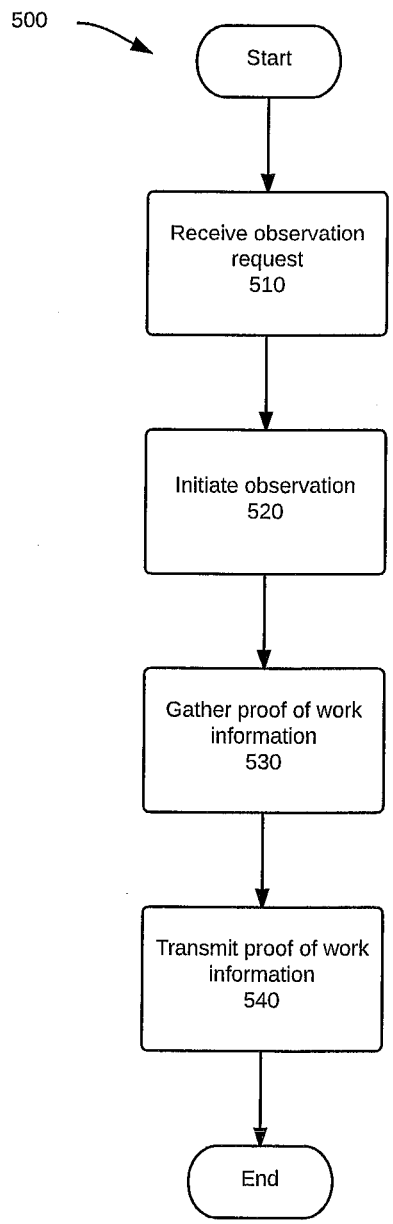
FIG. 5 is a flowchart that illustrates actions that can be performed by one or more sensor devices in conjunction with observing a physical power challenge, according to one embodiment.

FIG. 5 is a flowchart of method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 500, which is described with reference to the example elements shown in FIG. 1, shows a procedure that can be performed by one or more sensor devices (including any sensing modules included therein or otherwise connected thereto) in accordance with this disclosure. More specifically, method 500 depicts a method for observing a physical power challenge in conjunction with embodiments of methods and systems such as those disclosed herein. In one embodiment, method 500 depicts steps that can be performed in conjunction with steps 280 and 285 of FIG. 2.

Method 500 begins at step 510, where a sensor device, such as any of sensor devices 140(1)-(*n*), receives a request to observe a power challenge that is being (or has been) initiated on an endpoint device, such as endpoint device 130. In one embodiment, this request includes the parameters of the power signature that is at issue, including at least, e.g., the specific action(s) to be performed and the specific time intervals during which those action(s) should be performed. In one embodiment, this request includes information identifying the endpoint device that is being challenged. In one embodiment, the request to observe a power challenge may be received in the form of a token, or other data format, such as, e.g., a data packet. In one embodiment, the request to observe a power challenge may be received via a PoE connection, although embodiments can use other connections, such as, e.g., a secured network connection. In one embodiment, one or more steps of method 500 can be performed, either in whole or in part, but one or more of sensing modules 145(1)-(*n*) Each of sensing module 145 can be configured to perform one or more of the steps related to observing power challenges and/or power signatures with respect to this disclosure, such as, for example, observing endpoint device 130 performing one or more actions such as, e.g., blinking or modulating a light, turning a fan on or off, observing an audible noise, or changing the ambient temperature or air flow rate (such as, e.g., in the case of an HVAC system).

Upon receiving the request to observe a power challenge, the sensor device then initiates observation in step 520. In one embodiment, the sensor devices only initiates observation of the challenged endpoint device. In another embodiment, the sense device initiates observation of all of the endpoint devices in the room, which is specifically useful if the specific location or identity of the challenged endpoint device is unknown. In step 520, the sensor device observes the endpoint device during the time interval specified in the power challenge. In one embodiment, the sensor device observes the endpoint for slightly longer than the specific time interval specified in the power challenge, in order to allow for lag time from when the endpoint device receives the power challenge to when the endpoint device begins execution of the power challenge.

Regardless of whether the sensor device initiates observation of one or multiple endpoint devices, sensor device gathers appropriate proof of work information in step 530. Further details regarding the types of information that may be gathered, and the manner in which that information may be gathered, is provided above with respect to method 200, and specifically with respect to (but not limited to) the discussion of steps 280 and 285 and the surrounding context.

For instance, and as discussed above, the sensor device gathers proof of work information about the observed endpoint device(s) during the time period designated by the power challenge. The proof of work information gathered is based, at least in part, upon the configuration and capabilities of the specific sensor device gathering that information. For instance, and as discussed elsewhere herein, each sensor device can each be configured to observe various actions, but each sensor device is not necessarily identical to the other sensor devices in a given room. For instance, one sensor device may be configured to observe a blinking light, whereas another sensor device in the same physical location may not be capable of observing a blinking light. As another example, one sensor device may be capable of observing an audible noise, whereas another sensor device in the same physical room may not be configured to observe an audible noise. As another example, one sensor device may be capable of observing a fan being turned on and off, whereas another sensor device in the same physical location may not be capable of observing such behavior by the endpoint device. These are, of course, only examples, and many other configuration and observational capabilities are possible for any given sensor device. As will be appreciated in light of the present disclosure, different types of such sensor devices can be weighted differently, allowing such processes to give more (or less) "credence" to certain types of sensor devices as compared to other types of sensor devices.

In addition to considering the specific configuration and observational capabilities of a given sensor device, the gathered proof of work information also relates to the specified power signature included with the power challenge. For instance, if the power signature requested the endpoint device to modulate its power within a specific power range, the sensor device may gather (or attempt to gather) information related to such power modulation during the specified time period. If the power signature requested the endpoint device to cycle the fan, the sensor device may gather (or attempt to gather) information related to the fan during the specified time period. As another example, if the power signature requested the endpoint device to blink (or otherwise modulate) a light in a specific pattern, the power interface may gather (or attempt to gather) information related to the emittance of light by the endpoint device. In other embodiments, other information may be gathered as appropriate for a given power signature and power challenge, and subject to the configuration and observational capabilities of the sensor device.

Moreover, and as discussed above with respect to the power interface, the various sensor devices can gather "proof of work" information either directly or indirectly. That is, a sensor device does not have to directly observe performance of the specified activity, but in some embodiments may alternatively observe evidence of performance of the specified activity. For instance, if the power challenge requests the endpoint device to modulate its power in a specific pattern, a sensor device may not be able to directly observe the power consumption for that device if the endpoint device is not directly connected to that sensor device. In this situation, the endpoint device can perform whatever activities are necessary to modulate its power in the pattern requested, with examples of such activities including the endpoint device turning its fan on and off, or brightening and dimming its screen. Although the sensor devices most likely cannot observe the change in the power consumption directly (because, e.g., the endpoint is most likely not physically connected to the sensor device), certain sensor devices can be configured to observe other information that may tend to indicate that the power was modulated, such as a blinking light on an endpoint device. In a different example, however, the power challenge may request the endpoint device to perform a specific activity, such as blinking a light in a given pattern. Such an activity may be more easily observed by the sensor devices in the room, assuming a given sensor device is appropriately configured, even though a power interface (e.g., a power strip) may not be able to directly observe a light blinking (or otherwise being modulated) on the endpoint device. In this situation, a sensor devices including the necessary light sensors can directly observe the light blinking (or otherwise being modulated), and can thus provide direct evidence of the proof of work.

After gathering the relevant proof of work information, the power interface transmits the proof of work information in step 540. In one embodiment, the proof of work information is transmitted to the server that issued the observation request that was received in step 510. In one embodiment, the sensor device also includes identifying information with the proof of work transmission, including, e.g., the type of device, the manufacturer of the sensor device, and location information, among other types of potential information about the sensor device. In one embodiment, this proof of work information is transmitted via the PoE connection over which the observation request was received in step 510, but in other embodiments, the proof of work information can be transmitted over other connections, such as, e.g., a secured network connection. In one embodiment, the proof of work information is transmitted via a data packet, although the proof of work information may be transmitted in other formats as well.

Example Networking Devices

Figure 6:
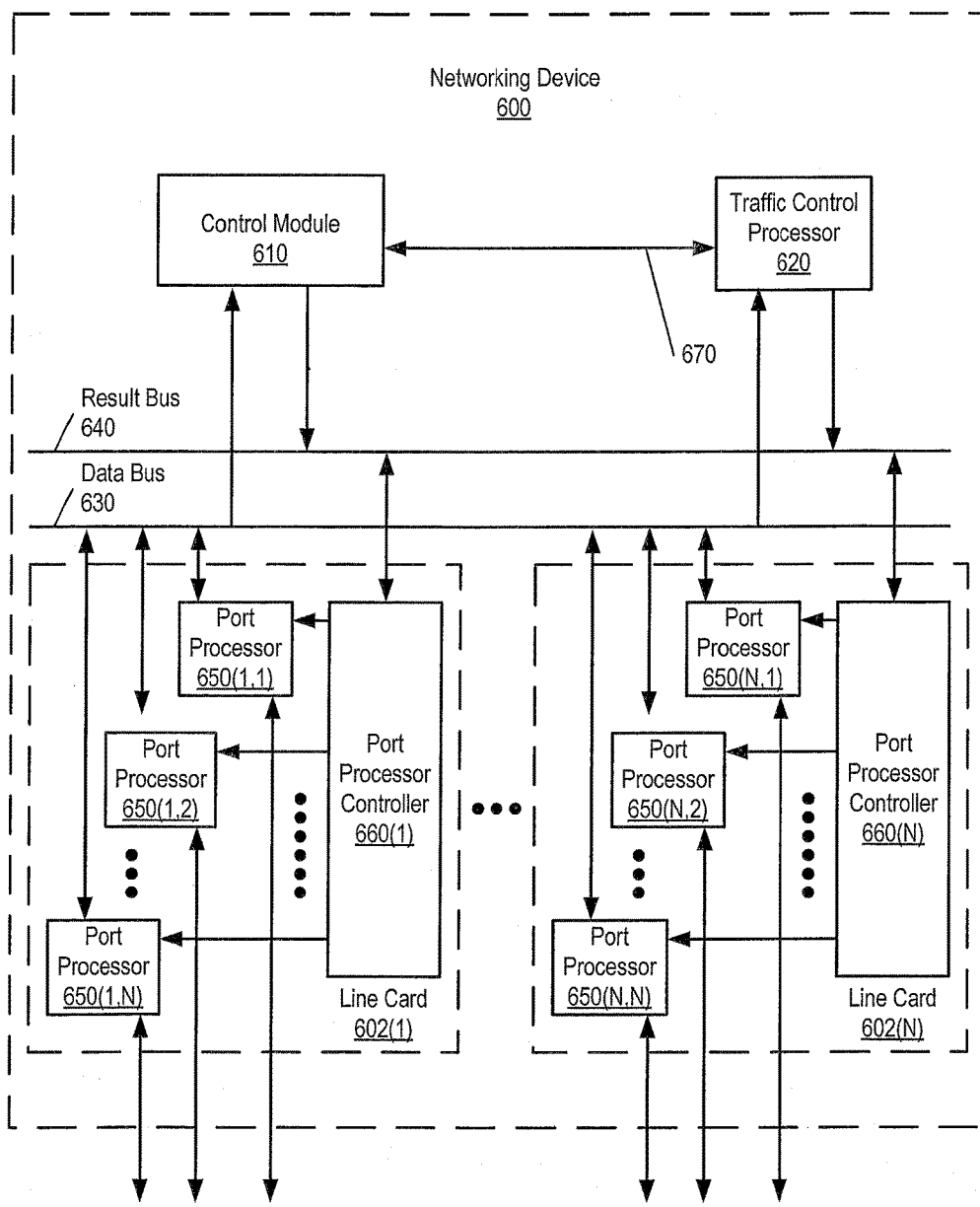
FIG. 6 is a block diagram illustrating components of an example networking device in which the present disclosure can be implemented, according to one embodiment.

FIG. 6 is a block diagram illustrating components of an example networking device 600, which depicts (at least in part) one configuration of a network device or a network routing element (e.g., a hub, router, switch, or similar device). In this depiction, networking device 600 includes a number of line cards (line cards 602(1)-602(N)) that are communicatively coupled to a control module 610 (which can include a forwarding engine, not shown) and a traffic control (or flow control) processor 620 via a data bus 630 and a result bus 640. Line cards 602(1)-(N) include a number of port processors 650(1,1)-650(N,N) which are controlled by port processor controllers 660(1)-660(N). It will also be noted that control module 610 and traffic control processor 620 are not only coupled to one another via data bus 630 and result bus 640, but are also communicatively coupled to one another by a communications link 670. It is noted that in alternative embodiments, each line card can include its own forwarding engine.

When a message (e.g., a power challenge or token, observation request, or a message containing proof of work information) is received by a network device or network routing element such as networking device 600, the message can be identified and analyzed in the following manner. Upon receipt, a message (or some or all of its control information) is sent from one of the port processors 650(1, 1)-650(N,N) at which the message was received to one or more of those devices coupled to data bus 630 (e.g., others of port processors 650(1,1)-650(N,N), a forwarding engine, and/or traffic control processor 620). Handling of the message can be performance, for example, by a forwarding engine in accordance with the systems and methods disclosed herein. For example, a forwarding engine may determine that the message should be forwarded to one or more of port processors 650(1,1)-650(N,N). This can be accomplished by indicating to a corresponding one(s) of port processor controllers 660(1)-660(N) that the copy of the message held in the given one(s) of port processors 650(1, 1)-650(N,N) should be forwarded to the appropriate one of port processors 650(1,1)-650(N,N).

Networking device 600 can be used, for example, in the implementation of a network device (e.g., power interface 120 or sensor devices 140) or a network routing element in control module 610, or in one or more of port processor controllers 660(1)-660(N) and/or in traffic control processor 620, in order to implement the present disclosure. Although not shown, network device 600 can also be used to implement a routing protocol module and/or network reachability protocol module in control module 610, in one of port processor controllers 660(1)-660(N), and/or in traffic control processor 620.

An incoming message (e.g., a power challenge or token, observation request, or a message containing proof of work information) can be provided to a network device or network routing element via a forwarding engine or port processor of a line card coupled to a port that received the incoming message. Network device 600 can be configured to process the incoming message and to generate one or more outgoing messages (e.g., a power challenge or token, observation request, or a message containing proof of work information), as described throughout this disclosure.

The outgoing message can be provided to a forwarding engine by a network device or a network routing device, which can determine that the outgoing message should be forwarded to one or more of port processors 650(1,1)-650(N,N) that are configured to transmit the outgoing message toward the outgoing message's destination.

Figure 7:
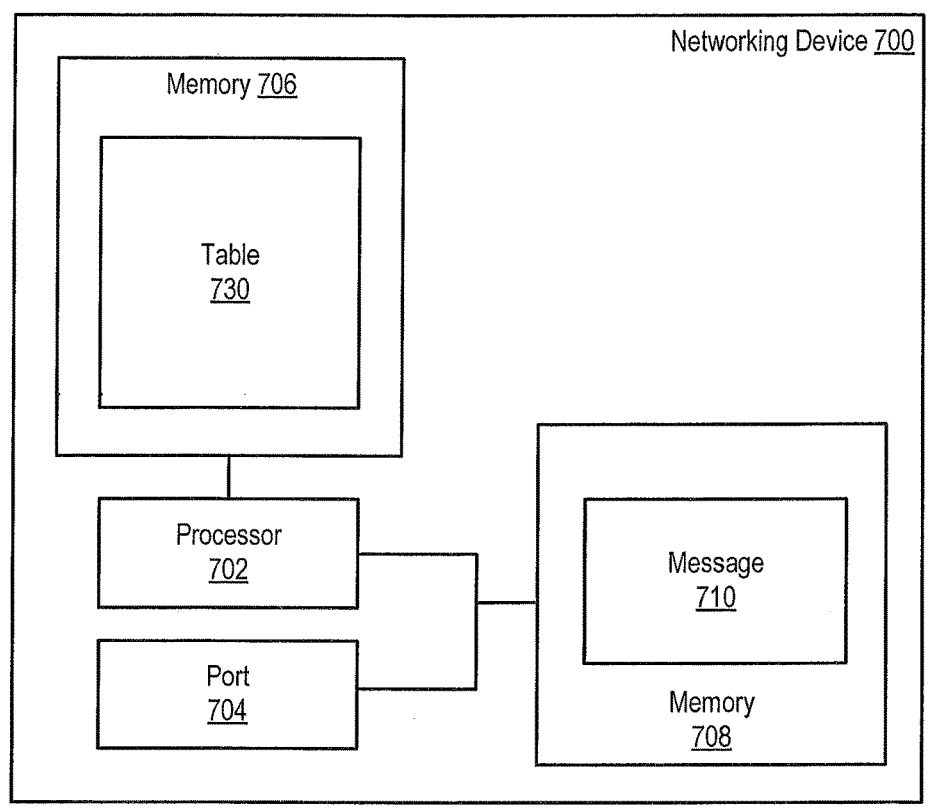
FIG. 7 is a block diagram illustrating components of an example networking device in which the present disclosure can be implemented, according to one embodiment.

FIG. 7 is a block diagram illustrating components of an example networking device 700, in which the networking device is configured as a network device (e.g., power interface 120 or sensor devices 140) or a network routing element. As illustrated, networking device 700 includes one or more processors 702 (e.g., microprocessors, PLDs (Programmable Logic Devices), or ASICs (Application Specific Integrated Circuits)) configured to execute program instructions stored in memories 706 and/or 708, which are computer readable storage media. Memories 706 and 708 can include various types of RAM (Random Access Memory), ROM (Read Only Memory), Flash memory, MEMS (Micro Electro-Mechanical Systems) memory, and the like. Networking device 700 also includes one or more ports 704 (e.g., one or more hardware ports or other network interfaces that can be linked to other networking devices, hosts, servers, storage devices, or the like). Processor 702, port 704, and memories 706 and 708 are coupled to send and receive data and control signals by one or more buses or other interconnects.

In this example, program instructions executable to implement the systems and methods disclosed herein are stored in memory 706. Topology information and network reachability information can be stored in one or more tables 730.

Message 710 (e.g., a power challenge or token, observation request, or a message containing proof of work information) is stored in memory 708. In one embodiment, message 710 can be received from port 704 (e.g., received from another networking device coupled to port 704), and can be stored in memory 708 before being provided forwarded to another networking device in accordance with the systems and methods of this disclosure. In one embodiment, outgoing message 710 can be generated and stored in memory 708 before being transmitted via port 704.

Example Computing and Network Environment

As shown above, the present disclosure can be implemented using a variety of computer systems and networks. An example of one such computing environment is described below with reference to FIG. 8.

Figure 8:
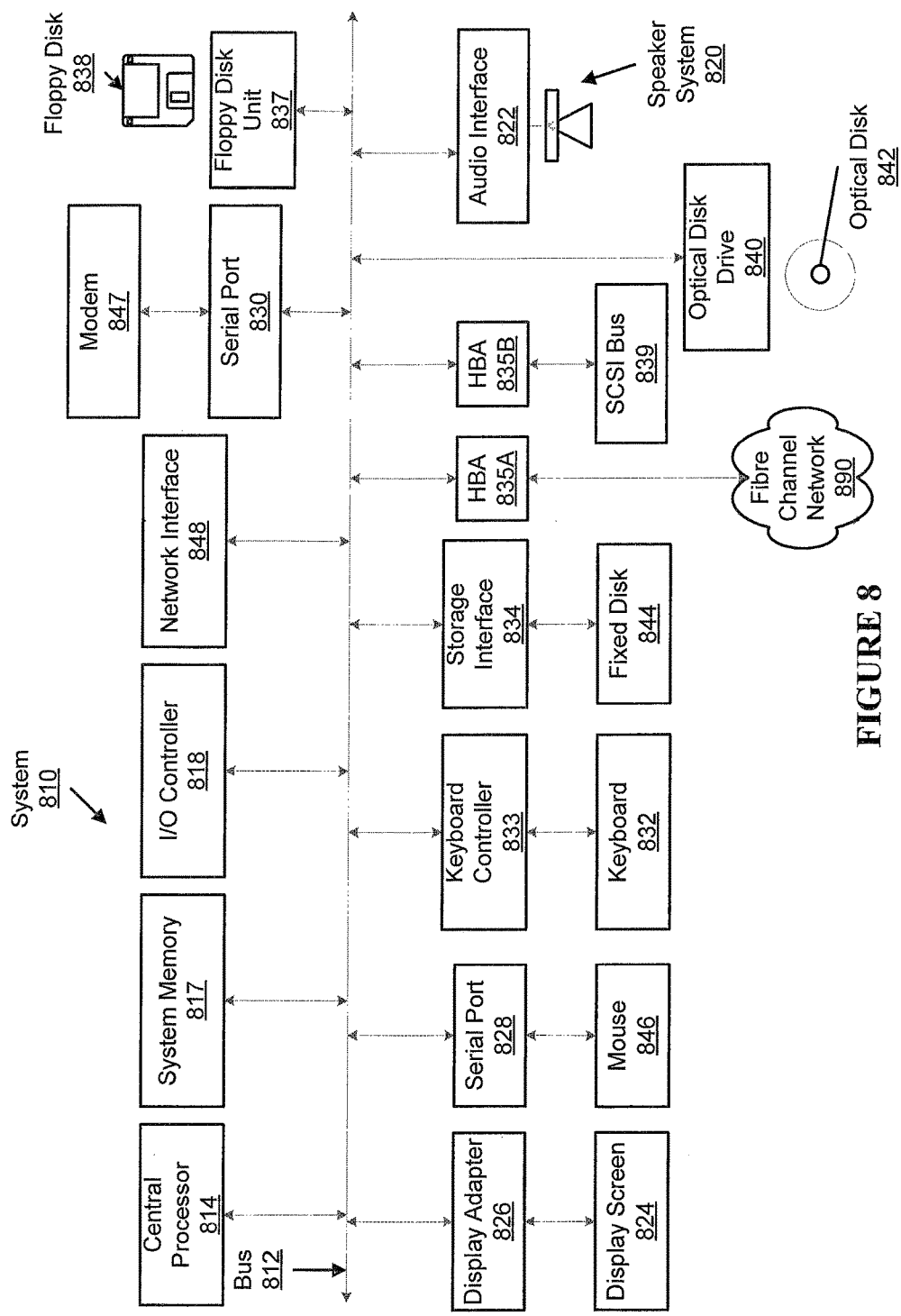
FIG. 8 is a simplified block diagram of a network architecture suitable for implementing aspects of the present disclosure, according to one embodiment.

FIG. 8 depicts a block diagram of a computer system 810 suitable for implementing aspects of the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident within (or otherwise added to or stored in) computer system 810 are generally stored on and accessed via a computer-readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer-readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising
determining whether to initiate a power challenge for an endpoint device;
in response to a determination to initiate a power challenge, determining whether the endpoint device is connected to a trusted power interface;
in response to a determination that the endpoint device is connected to the trusted power interface,
sending a power challenge to the endpoint device via a power interface, wherein
the endpoint device is connected to the power interface, and
the power challenge requires the endpoint device to modulate power used by endpoint device in a specified pattern, and
sending an observation request to one or more of a plurality of sensor devices;
receiving first proof of work information from the power interface, wherein
the power interface determines the first proof of work information by observing a pattern of power that passes through the power interface during a period in which the endpoint device is performing the power challenge;
receiving second proof of work information from one or more of the plurality of sensor devices, wherein
the one or more of the plurality of the sensor devices determines the second proof of work information by observing a pattern emitted by the endpoint device during the period in which the endpoint device is performing the power challenge; and
determining whether the endpoint device adequately performed the power challenge by processing the first proof of work information and the second proof of work information.

2. The method of claim 1, wherein the processing further comprises
determining whether a trusted sensor device adequately observed a power signature associated with the power challenge.

3. The method of claim 2, wherein the processing further comprises
authenticating the endpoint device in response to a determination that a trusted sensor device adequately observed the power signature.

4. The method of claim 1, wherein the processing further comprises
determining whether a quorum of the plurality of sensor devices observed a power signature associated with the power challenge.

5. The method of claim 1, wherein the processing further comprises
generating a weighted average, wherein
the weighted averaged is based on the second proof of work information received from the one or more of the plurality of sensor devices.

6. The method of claim 1, further comprising
authenticating the endpoint device in response to a determination that the endpoint device adequately performed the power challenge.

7. The method of claim 1, further comprising
initiating an error protocol in response to a determination that the endpoint device did not adequately perform the power challenge.

8. The method of claim 1, further comprising
determining whether to initiate a power challenge for an endpoint device; and
the determining whether the endpoint device is connected to the trusted power interface is performed in response to a determination to initiate the power challenge.

9. A system comprising:
a challenge initiating module, wherein the challenge initiating module is configured to
determine whether to initiate a power challenge for an endpoint device,
in response to a determination to initiate a power challenge, determine whether the endpoint device is connected to a trusted power interface, and
in response to a determination that the endpoint device is connected to the trusted power interface,
send a power challenge to the endpoint device via a power interface, wherein
the endpoint device is connected to the power interface, and
the power challenge requires the endpoint device to modulate power used by endpoint device in a specified pattern;
a server interface module, wherein the server interface module is configured to
send an observation request to one or more of a plurality of sensor devices, wherein
the observation request is sent in response to the determination that the endpoint device is not connected to the trusted power interface, and
the server interface module is further configured to
receive first proof of work information from the power interface, wherein
the power interface determines the first proof of work information by observing a pattern of power that passes through the power interface during a period in which the endpoint device is performing the power challenge, and
receive second proof of work information from one or more of the plurality of sensor devices, wherein
the one or more of the plurality of the sensor devices determines the second proof of work information by observing a pattern emitted by the endpoint device during the period in which the endpoint device is performing the power challenge; and a challenge processing module, wherein the challenge processing module is configured to determine whether the endpoint device adequately performed the power challenge by processing the first proof of work information and the second proof of work information.

10. The system of claim 9, wherein the challenge processing module is further configured to determine whether a trusted sensor device adequately observed a power signature associated with the power challenge.

11. The system of claim 10, wherein the challenge processing module is further configured to authenticate the endpoint device in response to a determination that a trusted sensor device adequately observed the power signature.

12. The system of claim 9, wherein the challenge processing module is further configured to determine whether a quorum of the plurality of sensor devices observed a power signature associated with the power challenge.

13. The system of claim 9, wherein the challenge processing module is further configured to generate a weighted average, wherein the weighted averaged is based on the second proof of work information received from the one or more of the plurality of sensor devices.

14. The system of claim 9, wherein the challenge processing module is further configured to authenticate the endpoint device in response to a determination that the endpoint device adequately performed the power challenge.

15. The system of claim 9, wherein the challenge processing module is further configured to initiate an error protocol in response to a determination that the endpoint device did not adequately perform the power challenge.

16. An apparatus comprising:

a challenge initiating module, wherein the challenge initiating module is configured to determine whether to initiate a power challenge for an endpoint device, in response to a determination to initiate a power challenge, determine whether the endpoint device is connected to a trusted power interface, and in response to a determination that the endpoint device is connected to the trusted power interface, send a power challenge to the endpoint device via a power interface, wherein the endpoint device is connected to the power interface, and the power challenges requires the endpoint device to modulate power used by endpoint device in a specified pattern;

a server interface module, wherein the server interface module is configured to send an observation request to one or more of a plurality of sensor devices, wherein the observation request is sent in response to the determination that the endpoint device is not connected to the trusted power interface, and the server interface module is further configured to receive first proof of work information from the power interface, wherein the power interface determines the first proof of work information by observing a pattern of power that passes through the power interface during a period in which the endpoint device is performing the power challenge, and receive second proof of work information from one or more of the plurality of sensor devices, wherein the one or more of the plurality of the sensor devices determines the second proof of work information by observing a pattern emitted by the endpoint device during the period in which the endpoint device is performing the power challenge; and a challenge processing module, wherein the challenge processing module is configured to determine whether the endpoint device adequately performed the power challenge by processing the first proof of work information and the second proof of work information.

17. The apparatus of claim 16, wherein the challenge processing module is further configured to determine whether a trusted sensor device adequately observed a power signature associated with the power challenge.

18. The apparatus of claim 17, wherein the challenge processing module is further configured to authenticate the endpoint device in response to a determination that a trusted sensor device adequately observed the power signature.

19. The apparatus of claim 16, wherein the challenge processing module is further configured to determine whether a quorum of the plurality of sensor devices observed a power signature associated with the power challenge.

20. The apparatus of claim 16, wherein the challenge processing module is further configured to generate a weighted average, wherein the weighted averaged is based on the second proof of work information received from the one or more of the plurality of sensor devices.

21. The apparatus of claim 16, wherein the challenge processing module is further configured to authenticate the endpoint device in response to a determination that the endpoint device adequately performed the power challenge.

* * * * *